(12) United States Patent
He et al.

(10) Patent No.: US 6,344,534 B2
(45) Date of Patent: Feb. 5, 2002

(54) FUNCTIONAL POLYESTER POLYMER AND PRODUCTION PROCESS THEREOF

(75) Inventors: Shougang He; Tadashi Teranishi, both of Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/794,341

(22) Filed: Feb. 28, 2001

(30) Foreign Application Priority Data

Feb. 29, 2000 (JP) ........................................ 2000-055057
Feb. 29, 2000 (JP) .......................................... 2000-55058
Feb. 29, 2000 (JP) .......................................... 2000-55060

(51) Int. Cl.[7] ............................................... C08G 63/18
(52) U.S. Cl. ....................................... 528/298; 528/307
(58) Field of Search ................................. 528/298, 307

(56) References Cited

U.S. PATENT DOCUMENTS 5,567,796 A * 10/1996 Nakatsukasa et al. ....... 528/272
2001/0005278 A1 * 6/2001 Onomichi ................... 359/350

FOREIGN PATENT DOCUMENTS

| JP | 1138225 | 5/1989 |
| JP | 2038428 | 2/1990 |
| JP | 1135665 | 2/1999 |

* cited by examiner

*Primary Examiner*—Samuel A. Acquah

(57) ABSTRACT

A polyester polymer is a condensation product of a diol component and a dicarboxylic acid component, and the diol component (i) includes at least one tricyclo[$5.2.1.0^{2,6}$] decanedimethanol represented by the following formula (1):

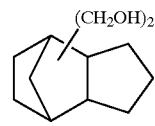

(1)

wherein two hydroxymethyl groups are bound to carbon atoms constituting tricyclo[$5.2.1.0^{2,6}$]decane ring and wherein each of carbon atoms constituting the ring may have at least one additional substituent; or (ii) the dicarboxylic acid component includes at least one tricyclo[$5.2.1.0^{2,6}$] decanedicarboxylic acid represented by the following formula (2):

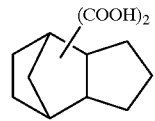

(2)

wherein two carboxyl groups are bound to carbon atoms constituting tricyclo[$5.2.1.0^{2,6}$]decane ring and wherein each of carbon atoms constituting the ring may have at least one additional substituent. The polyester polymer has an excellent formability in addition to a high heat resistance, low water absorption property, and satisfactory optical characteristics.

10 Claims, No Drawings

FUNCTIONAL POLYESTER POLYMER AND PRODUCTION PROCESS THEREOF

BACKGROUND OF THE INVENTION

1. Field of the Invention

The present invention relates to a novel polyester polymer and a production process thereof. Specifically, the present invention relates to a polyester polymer having a high heat resistance and a low water absorption property, a low optical anisotropy, and a satisfactory formability (moldability), and to a production process of the polyester polymer. The polyester polymer is useful as, for example, an optical material, electronic information material, and medical device material.

2. Description of the Related Art

Intensive research and development on the application of a plastic to an optical material, electronic information material, and medical device material have been conducted in recent years. Such a plastic for use as an optical material or electronic information material must have a low optical anisotropy in addition to a high transparency, a low water absorption property and a high heat resistance. Likewise, a plastic for use as a medical device material must have satisfactory compatibility with blood, mechanical strength, and resistance to hydrolysis.

Poly(methyl methacrylate), polycarbonates, and amorphous polyolefins are used as the optical materials. However, poly(methyl methacrylate) has a high hygroscopicity to cause deformation such as warpage and has an insufficient heat resistance, although it is excellent in transparency and is low in optical anisotropy. A polycarbonate is high in optical anisotropy, although it is excellent in heat resistance. An amorphous polyolefin is insufficient in formability (moldability) and adhesive property, although it is low in optical anisotropy and is excellent in heat resistance.

Separately, attempts have been made to use a polyester polymer as an optical material or electronic information material. For example, Japanese Unexamined Patent Application Publication No. 1-138225 discloses a polyester resin obtained by using a diol or dicarboxylic acid having an aromatic ring in a side chain. Japanese Unexamined Patent Application Publication No. 2-38428 discloses a polyester copolymer obtained by using diphenyldicarboxylic acid as a dicarboxylic acid component. Japanese Unexamined Patent Application Publication No. 11-35665 discloses a polyester composed of a 2,2-norbornanedimethanol derivative, terephthalic acid, and other components. However, these resins do not always sufficiently have a high heat resistance, low water absorption property, and satisfactory optical characteristics.

SUMMARY OF THE INVENTION

Accordingly, it is an object of the present invention to provide a novel polyester polymer which has a high heat resistance, a low water absorption property, and satisfactory optical characteristics and is excellent in formability, and to provide a production process of the polyester polymer.

After intensive investigations to achieve the above objects, the present inventors found that a polyester resin having a specific structure, specifically, a polyester resin having a tricyclo[$5.2.1.0^{2,6}$]decane ring have a high heat resistance, low water absorption property, excellent optical characteristics, and satisfactory formability. The present invention has been accomplished based on these findings.

Specifically, the present invention provides, in an aspect, a polyester polymer which is a condensation product of a diol component and a dicarboxylic acid component. In the polyester polymer, (i) the diol component includes at least one tricyclo[$5.2.1.0^{2,6}$]decanedimethanol represented by the following formula (1):

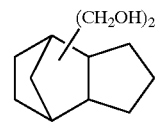

(1)

wherein two hydroxymethyl groups are bound to carbon atoms constituting tricyclo[$5.2.1.0^{2,6}$]decane ring and wherein each of carbon atoms constituting the ring may have at least one additional substituent, or (ii) the dicarboxylic acid component includes at least one tricyclo[$5.2.1.0^{2,6}$]decanedicarboxylic acid represented by the following formula (2):

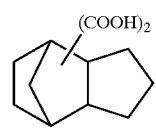

(2)

wherein two carboxyl groups are bound to carbon atoms constituting tricyclo[$5.2.1.0^{2,6}$]decane ring and wherein each of carbon atoms constituting the ring may have at least one additional substituent.

The polyester polymer includes, for example, a polyester polymer which is a condensation product of a diol component including at least one tricyclo[$5.2.1.0^{2,6}$]decanedimethanol represented by the formula (1) with a dicarboxylic acid component, or a reactive derivative thereof, including at least one tricyclo[$5.2.1.0^{2,6}$]decanedicarboxylic acid represented by the formula (2).

In another aspect, the present invention provides a process for producing a polyester polymer including the step of subjecting a diol component and a dicarboxylic acid component or a reactive derivative thereof to polycondensation. In the process, (i) a diol component including at least one tricyclo[$5.2.1.0^{2,6}$]decanedimethanol represented by the formula (1) is used as the diol component; or (ii) a dicarboxylic acid component including at least one tricyclo[$5.2.1.0^{2,6}$]decanedicarboxylic acid represented by the formula (2) or a reactive derivative thereof is used as the dicarboxylic acid component.

In an embodiment of the production process, a diol component including at least one tricyclo[$5.2.1.0^{2,6}$]decanedimethanol represented by the formula (1) and a dicarboxylic acid component, or a reactive derivative, including at least one tricyclo[$5.2.1.0^{2,6}$]decanedicarboxylic acid represented by the formula (2) are subjected to polycondensation.

As the diol component, a diol component can be used which includes at least one tricyclo[$5.2.1.0^{2,6}$]decanedimethanol selected from among a tricyclo[$5.2.1.0^{2,6}$]decane-3,8-dimethanol, a tricyclo[$5.2.1.0^{2,6}$]decane-3,9-dimethanol, and tricyclo[$5.2.1.0^{2,6}$]decane-4,8-dimethanol represented by the following formulae (1a) to (1c):

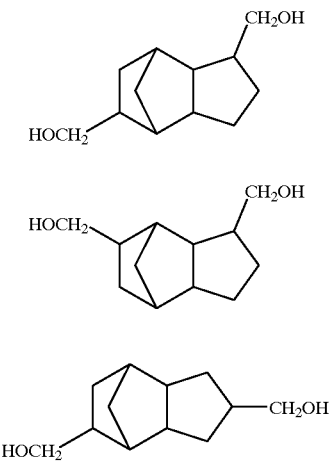

(1a)
(1b)
(1c)

wherein each of carbon atoms constituting a ring may have at least one substituent. As the dicarboxylic acid component, a dicarboxylic acid component can be used, which includes at least one tricyclo[5.2.1.0$^{2,6}$]decanedicarboxylic acid or a reactive derivative thereof selected from among a tricyclo[5.2.1.0$^{2,6}$]decane-3,8-dicarboxylic acid, a tricyclo[5.2.1.0$^{2,6}$]decane-3,9-dicarboxylic acid, and a tricyclo[5.2.1.0$^{2,6}$]decane-4,8-dicarboxylic acid represented by the following formulae (2a) to (2c):

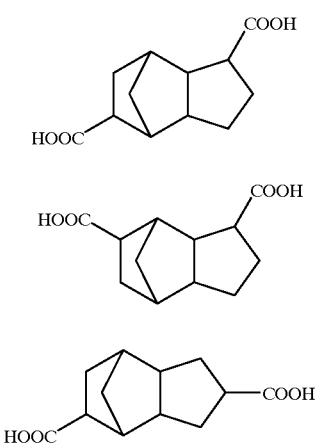

(2a)
(2b)
(2c)

wherein each of carbon atoms constituting a ring may have at least one substituent.

DESCRIPTION OF THE PREFERRED EMBODIMENTS

In tricyclo[5.2.1.0$^{2,6}$]decanedimethanols represented by the formula (1), two hydroxymethyl groups indicated in the formula may be bound to any of carbon atoms constituting tricyclo[5.2.1.0$^{2,6}$]decane ring (carbon atoms at the bridgehead position or at the non-bridgehead position). For example, assuming that the tricyclo[5.2.1.0$^{2,6}$]decane ring is divided into a norbornane ring and a cyclopentane ring, the two hydroxymethyl groups may be bound to carbon atoms constituting the norbornane ring or may be bound to carbon atoms constituting the cyclopentane ring. Alternatively, it is acceptable that one hydroxymethyl group is bound to a carbon atom consisting the norbornane ring and the other is bound to a carbon atom constituting the cyclopentane ring. Each of these position isomers can be used alone or in combination. There are endo form and exo form in the tricyclo[5.2.1.0$^{2,6}$]decanedimethanols represented by the formula (1), and either one or a mixture of these forms can be used in the present invention.

In the formula (1), each of carbon atoms constituting the ring (carbon atoms at the bridgehead position or at the non-bridgehead position) may have at least one substituent in addition to the two hydroxymethyl groups. Such additional substituents include, but are not limited to, methyl, ethyl, propyl, isopropyl, butyl, pentyl, hexyl, decyl, and other alkyl groups (e.g., $C_1$–$C_{10}$ alkyl groups, and preferably $C_1$–$C_4$ alkyl groups); cyclopentyl, cyclohexyl, and other cycloalkyl groups; phenyl, naphthyl, and other aryl groups; methoxy, ethoxy, isopropoxy, and other alkoxy groups (e.g., $C_1$–$C_4$ alkoxy groups); methoxycarbonyl, ethoxycarbonyl, isopropoxycarbonyl, and other alkoxycarbonyl groups (e.g., $C_1$–C4 alkoxy-carbonyl groups); acetyl, propionyl, butyryl, benzoyl, and other acyl groups; hydroxyl group; carboxyl group; nitro group; substituted or unsubstituted amino groups; halogen atoms; and oxo group.

Of the tricyclo[5.2.1.0$^{2,6}$]decanedimethanols represented by the formula (1), tricyclo[5.2.1.0$^{2,6}$]decane-3,8-dimethanols, tricyclo[5.2.1.0$^{2,6}$]decane-3,9-dimethanols, and tricyclo[5.2.1.0$^{2,6}$]decane-4,8-dimethanols represented by the formulae (1a) to (1c) are preferred. In the formulae (1a) to (1c), substituents which carbon atoms constituting the ring may have are similar to those mentioned above.

The tricyclo[5.2.1.0$^{2,6}$]decanedimethanols represented by the formula (1) can be obtained by a known or conventional technique.

Each of the tricyclo[5.2.1.0$^{2,6}$]decanedimethanols represented by the formula (1) can be used alone or in combination in the present invention. Other diol components can be used as the diol component constituting the polyester polymer of the invention, in addition to, or instead of the tricyclo[5.2.1.0$^{2,6}$]decanedimethanol represented by the formula (1). Such other diol components include diols for use as materials for conventional polyester polymers, such as ethylene glycol, propylene glycol, trimethylene glycol, 1,4-butanediol, 1,5-pentanediol, 1,6-hexanediol, neopentyl glycol, and other aliphatic diols; 1,4-cyclohexanedimethanol, 1,3-cyclohexanedimethanol, 1,2-cyclohexanedimethanol, 1,1-cyclohexanedimethanol, 2-methyl-1,1-cyclohexanediol, hydrogenated bisphenol A, 2,2-norbornanedimethanol, 3-methyl-2,2-norbornanedimethanol, 2,3-norbornanedimethanol, 2,5-norbornanedimethanol, 2,6-norbornanedimethanol, perhydro-1,4:5,8-dimethanonaphthalene-2,3-dimethanol, adamantanedimethanol, 1,3-dimethyl-5,7-adamantanedimethanol, 1,3-adamantanediol, 1,3-dimethyl-5,7-adamantanediol, and other alicyclic diols; hydroquinone, catechol, resorcin, naphthalenediol, xylylenediol, bisphenol A, an ethylene oxide adduct of bisphenol A, bisphenol S, an ethylene oxide adduct of bisphenol S, and other aromatic diols; diethylene glycol, triethylene glycol, polyethylene glycol, dipropylene glycol, and other ether glycols. Each of these diol components can be used alone or in combination.

The ratio of the tricyclo[5.2.1.0$^{2,6}$]decanedimethanol represented by the formula (1) to the overall diol components constituting the polyester polymer of the present invention can be freely selected and is generally about 1% to 100% by mole, preferably about 5% to 100% by mole, and more preferably about 10% to 100% by mole. When the tricyclo

[5.2.1.0$^{2,6}$]decanedicarboxylic acid represented by the formula (2) is used as the dicarboxylic acid component, the diol component may comprise no tricyclo[5.2.1.0$^{2,6}$]decanediol represented by the formula (1).

In the tricyclo[5.2.1.0$^{2,6}$]decanedicarboxylic acids represented by the formula (2), two carboxyl groups indicated in the formula may be bound to any of carbon atoms constituting tricyclo[5.2.1.0$^{2,6}$]decane ring (carbon atoms at the bridgehead position or at the non-bridgehead position). For example, assuming that the tricyclo[5.2.1.0$^{2,6}$]decane ring is divided into a norbornane ring and a cyclopentane ring, the two carboxyl groups may be bound to carbon atoms constituting the norbornane ring or may be bound to carbon atoms constituting the cyclopentane ring. Alternatively, it is acceptable that one carboxyl group is bound to a carbon atom consisting the norbornane ring and the other is bound to a carbon atom constituting the cyclopentane ring. Each of these position isomers can be used alone or in combination. There are endo form and exo form in the tricyclo[5.2.1.0$^{2,6}$]decanedicarboxylic acids represented by the formula (2), and either one or a mixture of these forms can be used in the present invention.

In the formula (2), carbon atoms constituting the ring (carbon atoms at the bridgehead position or at the non-bridgehead position) may have other substituents in addition to the two carboxyl groups. Such substituents include substituents which the carbon atoms constituting the tricyclo [5.2.1.0$^{2,6}$]decane ring in the compound of the formula (1) may have.

Of the tricyclo[5.2.1.0$^{2,6}$]decanedicarboxylic acids represented by the formula (2), tricyclo[5.2.1.0$^{2,6}$]decane-3,8-dicarboxylic acids, tricyclo[5.2.1.0$^{2,6}$]decane-3,9-dicarboxylic acids, and tricyclo[5.2.1.0$^{2,6}$]decane-4,8-dicarboxylic acids represented by the formulae (2a) to (2c) are preferred. The substituents which carbon atoms constituting the ring may have are similar to those mentioned above.

The tricyclo[5.2.1.0$^{2,6}$]decanedicarboxylic acids represented by the formula (2) can be prepared by or pursuant to a known or conventional technique. For example, a product tricyclo[5.2.1.0$^{2,6}$]decanedicarboxylic acid can be obtained by a process in which a tricyclo[5.2.1.0$^{2,6}$] decanedimethanol is oxidized with nitric acid, a corresponding crude tricyclo[5.2.1.0$^{2,6}$]decanedicarboxylic acid is filtrated off from the resulting reaction mixture, is dried and is recrystallized from an appropriate solvent such as acetone.

Each of the tricyclo[5.2.1.0$^{2,6}$]decanedicarboxylic acids represented by the formula (2) can be used alone or in combination in the present invention.

Other dicarboxylic acid components can be used as the dicarboxylic acid component constituting the polyester polymer of the present invention, in addition to or instead of the tricyclo[5.2.1.0$^{2,6}$]decanedicarboxylic acid represented by the formula (2). Such dicarboxylic acid components include those generally used as materials for polyester polymers, such as terephthalic acid, isophthalic acid, phthalic acid, 2,6-naphthalenedicarboxylic acid, 4,4'-biphenyldicarboxylic acid, 4,4'-diphenyl ether dicarboxylic acid, 4,4'-diphenylmethanedicarboxylic acid, 4,4'-diphenyl sulfone dicarboxylic acid, 4,40-diphenylisopropylidenedicarboxylic acid, 1,2-diphenoxyethane-4',4''-dicarboxylic acid, anthracenedicarboxylic acid, 2,5-pyridinedicarboxylic acid, diphenyl ketone dicarboxylic acid, and other aromatic dicarboxylic acids; oxalic acid, succinic acid, glutaric acid, adipic acid, azelaic acid, sebacic acid, and other aliphatic dicarboxylic acids; 1,4-cyclohexanedicarboxylic acid, 1,3-cyclohexanedicarboxylic acid, 1,2-cyclohexanedicarboxylic acid, 2,3-norbornanedicarboxylic acid, 2,5-norbornanedicarboxylic acid, 2,6-norbornanedicarboxylic acid, perhydro-1,4:5,8-dimethanonaphthalene-2,3-dicarboxylic acid, adamantanedicarboxylic acid, 1,3-dimethyl-5,7-adamantanedicarboxylic acid, and other alicyclic dicarboxylic acids. Among them, alicyclic dicarboxylic acids are preferred. Each of these dicarboxylic acid components can be used alone or in combination.

The ratio of the tricyclo[5.2.1.0$^{2,6}$]decanedicarboxylic acid represented by the formula (2) to the overall dicarboxylic acid components constituting the polyester polymer of the present invention can be freely selected and is generally about 1% to 100% by mole, preferably about 5% to 100% by mole, and more preferably about 10% to 100% by mole. When the tricyclo[5.2.1.0$^{2,6}$]decanediol represented by the formula (1) is used as the diol component, the dicarboxylic acid component may comprise no tricyclo[5.2.1.0$^{2,6}$] decanedicarboxylic acid represented by the formula (2).

The polyester polymer of the present invention is preferably a polyester polymer comprising no component having a polymerizable double bond as the dicarboxylic acid component. It is typically preferably a saturated polyester polymer (a thermoplastic polyester polymer) composed of a dicarboxylic acid component and a diol component each having no polymerizable double bond.

The polyester polymer has a number average molecular weight of, for example, about 1000 to 150000 and preferably about 3000 to 100000.

The reduced viscosity of the polyester polymer of the present invention is preferably about 0.5 or more, as determined in a mixed solution of phenol/1,1,2,2-tetrachloroethane (weight ratio: 4/6) in a concentration of 1.2 g/dl at a temperature of 35° C., in order to yield satisfactory mechanical strengths as a molded article.

The polyester polymer of the present invention can be produced by polycondensation of a diol component containing at least one component selected from the tricyclo [5.2.1.0$^{2,6}$]decanedimethanols represented by the formula (1) with a dicarboxylic acid component (which may include the component represented by the formula (2)) or a reactive derivative thereof, or by polycondensation of a diol component (which may include the component represented by the formula (1)) with a dicarboxylic acid component containing at least one component selected from the tricyclo [5.2.1.0$^{2,6}$]decanedicarboxylic acids represented by the formula (2) or a reactive derivative thereof.

Such reactive derivatives of the dicarboxylic acid component include, for example, dicarboxylic esters, carboxylic anhydrides (anhydrides of dicarboxylic acids), and dicarboxyl halides (e.g., dicarboxyl chlorides). These dicarboxylic esters, carboxylic anhydrides, and dicarboxyl halides can be induced from corresponding dicarboxylic acids according to a conventional technique.

A general production process of a polyester can be applied as an embodiment of the production of the polyester polymer of the present invention. For example, when a free dicarboxylic acid or carboxylic anhydride is used as a starting material, the polyester polymer can be produced by heating a diol component and the dicarboxylic acid or carboxylic anhydride in a reactor and distilling off water produced by the reaction out of the reaction system. This reaction does not always require a catalyst, but the use of a catalyst can enhance the reaction. Such catalysts include, but are not limited to, acetates, carbonates, hydroxides, and alkoxides of alkali metals, alkaline earth metals, zinc, titanium, cobalt, manganese, and other metals. A reaction temperature is about 120° C. to 300° C., and preferably about 160° C. to 300° C. A reaction pressure is generally atmospheric pressure, but the esterification reaction may be performed under a reduced pressure to enhance distilling-off of water and excess diol component. The molar ratio of the diol component to the dicarboxylic acid or carboxylic anhydride may be about 1, but excess moles of the diol component may be used to yield a high molecular weight polyester.

When a dicarboxylic ester is used as a starting material, the polyester polymer can be produced by placing the diol component, the dicarboxylic ester and a catalyst in a reactor and distilling off an alcohol produced by the reaction out of the reaction system. Such dicarboxylic esters include, for example, methyl esters, ethyl esters, propyl esters, and butyl esters of a dicarboxylic acid, of which methyl esters are typically preferred from the viewpoints of the easiness of reaction and cost. The catalyst includes, but is not limited to, carboxylic acid salts, carbonates, hydroxides, alkoxides, and oxides of alkali metals, alkaline earth metals, zinc, lead, titanium, cobalt, manganese, tin, antimony, germanium, and other metals. A reaction temperature is about 120° C. to 300° C., and preferably about 160° C. to 300° C. A reaction pressure is generally atmospheric pressure, but the esterification reaction may be performed under a reduced pressure to enhance distilling-off of the alcohol. The molar ratio of the diol component to the dicarboxylic ester may be about 1, but excess moles of the diol component may be used to yield a high molecular weight polyester.

Using a dicarboxyl chloride or another dicarboxyl halide as a material, the polyester polymer can be obtained, for example, by (i) a process in which the diol component and the dicarboxyl halide are allowed to react at high temperatures in the absence of a solvent, and a produced hydrogen halide is distilled off; or by (ii) a process in which the diol component and the dicarboxyl halide are allowed to react at low temperatures in a solvent, and a produced hydrogen halide is distilled off or is neutralized with a basic substance. A reaction temperature can be appropriately selected within a range of 0° C. to 280° C.

The solvent for use in the process (ii) is not specifically limited as far as it is inert toward the reaction. Such solvents include, for example, dichloromethane, chloroform, 1,2-dichloroethane, monochlorobenzene, trichlorobenzene, and other halogenated hydrocarbons; benzene, toluene, xylene, and other aromatic hydrocarbons; tetrahydrofuran, dioxane, dimethoxyethane, and other ethers; acetone, ethyl methyl ketone, isobutyl methyl ketone, cyclohexanone, and other ketones; ethyl acetate, butyl acetate, and other esters; acetonitrile, and other nitrites; N,N-dimethylformamide, N,N-dimethylacetamide, N-methyl-2-pyrrolidone, and other amides; dimethyl sulfoxide, and other sulfoxides; 1,3-dimethyl-2-imidazoline, and other imidazolines; and hexanemethylphosphoramide. The basic substance includes, but is not limited to, triethylamine, tributylamine, N,N-dimethylaniline, and other tertiary amines; pyridine, α-picoline, β-picoline, γ-picoline, quinoline, and other basic nitrogen-containing heterocyclic compounds; sodium hydroxide, potassium hydroxide, and other alkali metal hydroxides; sodium acetate, sodium carbonate, sodium hydrogencarbonate, potassium acetate, potassium carbonate, and other alkali metal salts. The aforementioned solvents such as N-methyl-2-pyrrolidone also play a role as a basic substance.

The polyester polymer formed by polymerization can be isolated by a conventional technique such as filtration, concentration, precipitation, crystallization, and cooling-solidification.

The polyester polymer of the present invention has a bulky alicyclic structure and has a high heat resistance, low water absorption property, satisfactory optical characteristics, and excellent formability. Accordingly, the polyester polymer is useful as a material for an optical disk, lens, optical connector, and other optical/electronic information devices, as well as a material for a transfusion solution kit, catheter, syringe, vacuum blood collecting tube, and other medical devices.

The present invention will now be illustrated in further detail with reference to several examples below, which are not intended to limit the scope of the invention.

Synthesis Example 1

(Synthesis of tricyclo[$5.2.1.0^{2,6}$]decanedicarboxyl chloride)

Tricyclo[$5.2.1.0^{2,6}$]decanedicarboxylic acid (a mixture of 40% by weight of tricyclo[$5.2.1.0^{2,6}$]decane-3,8-dicarboxylic acid, 14% by weight of tricyclo[$5.2.1.0^{2,6}$]decane-3,9-dicarboxylic acid, and 42% by weight of tricyclo[$5.2.1.0^{2,6}$]decane-4,8-dicarboxylic acid) was allowed to react with thionyl chloride ($SOCl_2$), and the resulting reaction mixture was purified by distillation at atmospheric pressure, distillation under a reduced pressure, and rectification to thereby yield tricyclo[$5.2.1.0^{2,6}$]decanedicarboxyl chloride.

EXAMPLE 1

In a 50-ml flask, 2.09 g of 1,4-cyclohexanedicarboxyl chloride and 10 ml of dried monochlorobenzene were placed in a dried nitrogen atmosphere, and to the resulting mixture, a mixed solution of 1.96 g of tricyclo[$5.2.1.0^{2,6}$]decanedimethanol and 5 ml of dried pyridine was added dropwise at room temperature over five minutes while stirring. After the completion of addition, the resulting solution mixture was allowed to react at 80° C. for two hours. After the completion of polymerization, the reaction mixture was added dropwise in small batches to 500 ml of methanol to precipitate a produced polymer. The polymer was then filtrated, was rinsed, and was dried in vacuo to thereby yield 3.32 g of a white polyester polymer. The polymer had a number average molecular weight of 22800 and a molecular weight distribution (Mw/Mn) of 3.25, as determined by gel permeation chromatography (GPC) analysis. This polymer had a glass transition temperature (Tg) of 87.9° C. and a 5% weight reduction temperature in thermogravimetric analysis in nitrogen of 415.2° C., as determined by differential scanning calorimeter (DSC) and thermobalance (TG-DTA), respectively.

EXAMPLE 2

In a 50-ml flask, 2.61 g of tricyclo[$5.2.1.0^{2,6}$]decanedicarboxyl chloride obtained in Synthesis Example 1 and 10 ml of dried monochlorobenzene were placed in a dried nitrogen atmosphere, and to the resulting mixture, a mixed solution of 1.56 g of norbornanedimethanol (a mixture of 2,5-norbornanedimethanol and 2,6-norbornanedimethanol) in 5 ml of dried pyridine was added dropwise at room temperature over ten minutes while stirring. After the completion of addition, the solution mixture was allowed to react at 80° C. for two hours. After the completion of polymerization, the reaction mixture was added dropwise in small batches to 500 ml of methanol to precipitate a produced polymer. The polymer was then filtrated, was rinsed, and was dried in vacuo to thereby yield 3.44 g of a white polyester polymer. The polymer had a number average molecular weight of 9790 and a molecular weight distribution (Mw/Mn) of 2.24, as determined by GPC analysis. This polymer had a glass transition temperature (Tg) of 86.4° C. and a 5% weight reduction temperature in thermogravimetric analysis in nitrogen of 390.6° C., as determined by differential scanning calorimeter (DSC) thermobalance (TG-DTA), respectively.

EXAMPLE 3

In a 50-ml flask, a solution mixture of 1.96 g of dried 1,3-dimethyl-5,7-adamantanedimethanol, 5 ml of dried monochlorobenzene, and 5 ml of dried pyridine was placed in a dried nitrogen atmosphere, and to the resulting mixture, 2.61 g of tricyclo[5.2.1.0$^{2,6}$]decanedicarboxyl chloride obtained in Synthesis Example 1 and 5 ml of dried monochlorobenzene were added dropwise at room temperature over ten minutes while stirring. After the completion of addition, the solution mixture was allowed to react at 80° C. for two hours. After the completion of polymerization, the reaction mixture was added dropwise in small batches to 500 ml of methanol to precipitate a produced polymer. The polymer was then filtrated, was rinsed, and was dried in vacuo to thereby yield 3.85 g of a white polyester polymer. The polymer had a number average molecular weight of 6900 and a molecular weight distribution (Mw/Mn) of 2.76, as determined by GPC analysis. This polymer had Tg of 143.5° C. and a 5% weight reduction temperature in thermogravimetric analysis in nitrogen of 396.4° C., as determined by DSC and TG-DTA, respectively.

EXAMPLE 4

A reaction was performed in the same manner as in Example 1, except that 2.61 g of tricyclo[5.2.1.0$^{2,6}$]decanedicarboxyl chloride obtained in Synthesis Example 1 was used instead of 2.09 g of 1,4-cyclohexanedicarboxyl chloride to thereby yield 3.8 g of a white polyester polymer. The polymer had a number average molecular weight of 8980 and a molecular weight distribution (Mw/Mn) of 2.51, as determined by GPC analysis. This polymer had a glass transition temperature (Tg) of 95. 7° C. and a 5% weight reduction temperature in thermogravimetric analysis in nitrogen of 393.4° C., as determined by differential scanning calorimeter (DSC) and thermobalance (TG-DTA), respectively.

EXAMPLE 5

A reaction was performed in the same manner as in Example 1, except that 1.88 g of 1,4-cyclohexanedicarboxyl chloride and 0.26 g of tricyclo[5.2.1.0$^{2,6}$]decanedicarboxyl chloride obtained in Synthesis Example 1 were used instead of 2.09 g of 1,4-cyclohexanedicarboxyl chloride to thereby yield 3.1 g of a white polyester polymer. The polymer had a number average molecular weight of 26300 and a molecular weight distribution (Mw/Mn) of 2.85, as determined by GPC analysis. This polymer had Tg of 85.4° C. and a 5% weight reduction temperature in thermogravimetric analysis in nitrogen of 416.7° C., as determined by DSC and TG-DTA, respectively.

Other embodiments and variations will be obvious to those skilled in the art, and this invention is not to be limited to the specific matters stated above.

What is claimed is:

1. A polyester polymer being a condensation product of a diol component and a dicarboxylic acid component, wherein
(i) said diol component comprises at least one tricyclo [5.2.1.0$^{2,6}$]decanedimethanol represented by the following formula (1):

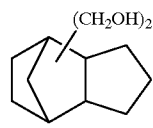

(1)

wherein two hydroxymethyl groups are bound to carbon atoms constituting tricyclo[5.2.1.0$^{2,6}$]decane ring and wherein each of carbon atoms constituting the ring may have at least one additional substituent; or (ii) said dicarboxylic acid component comprises at least one tricyclo[5.2.1.0$^{2,6}$]decanedicarboxylic acid represented by the following formula (2):

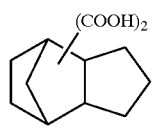

(2)

wherein two carboxyl groups are bound to carbon atoms constituting tricyclo[5.2.1.0$^{2,6}$]decane ring and wherein each of carbon atoms constituting the ring may have at least one additional substituent.

2. A polyester polymer according to claim 1, wherein said polyester polymer is a condensation product of:

a diol component comprising at least one tricyclo [5.2.1.0$^{2,6}$]decanedimethanol represented by the following formula (1):

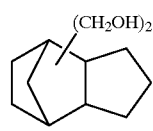

(1)

wherein two hydroxymethyl groups are bound to carbon atoms constituting tricyclo[5.2.1.0$^{2,6}$]decane ring and wherein each of carbon atoms constituting the ring may have at least one additional substituent; and a dicarboxylic acid component comprising at least one tricyclo[5.2.1.0$^{2,6}$]decanedicarboxylic acid represented by the following formula (2):

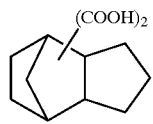

(2)

wherein two carboxyl groups are bound to carbon atoms constituting tricyclo[5.2.1.0$^{2,6}$]decane ring and wherein each of carbon atoms constituting the ring may have at least one additional substituent.

3. A polyester polymer according to claim 1 being a condensation product of a diol component and a dicarboxylic acid component, wherein said diol component comprises at least one tricyclo [5.2.1.0$^{2,6}$]decanedimethanol selected from the group consisting of a tricyclo[5.2.1.0$^{2,6}$]decane-3,8-dimethanol, a tricyclo[5.2.1.0$^{2,6}$]decane-3,9-dimethanol, and a tricyclo[5.2.1.0$^{2,6}$]decane-4,8-dimethanol represented by the following formulae (1a) to (1c):

(1a)
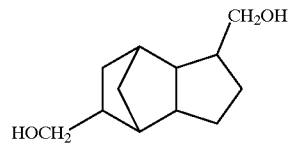

(1b)
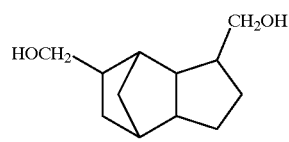

(1c)
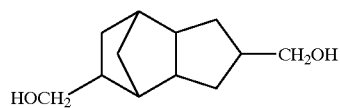

wherein each of carbon atoms constituting a ring may have at least one substituent; or said dicarboxylic acid component comprises at least one tricyclo[5.2.1.0$^{2,6}$]decanedicarboxylic acid selected from the group consisting of a tricyclo[5.2.1.0$^{2,6}$]decane-3,8-dicarboxylic acid, a tricyclo[5.2.1.0$^{2,6}$]decane-3,9-dicarboxylic acid, and a tricyclo[5.2.1.0$^{2,6}$]decane-4,8-dicarboxylic acid represented by the following formulae (2a) to (2c):

(2a)
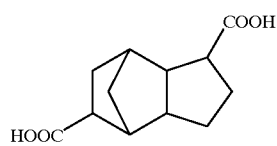

(2b)
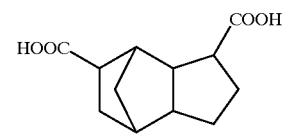

(2c)
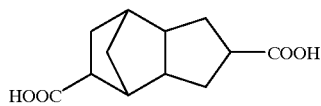

wherein each of carbon atoms constituting the ring may nave at least one substituent.

4. A polyester polymer according to claim 2, wherein said polyester polymer is a condensation product of:
a diol component comprising at least one tricyclo[5.2.1.0$^{2,6}$]decanedimethanol selected from the group consisting of a tricyclo[5.2.1.0$^{2,6}$]decane-3,8-dimethanol, a tricyclo[5.2.1.0$^{2,6}$]decane-3,9-dimethanol, and a tricyclo[5.2.1.0$^{2,6}$]decane-4,8-dimethanol represented by the following formulae (1a) to (1c):

(1a)
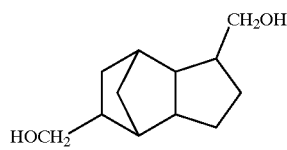

(1b)
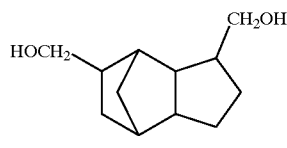

(1c)
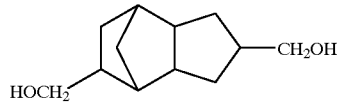

wherein each of carbon atoms constituting the ring may have at least one substituent; and a dicarboxylic acid component comprising at least one tricyclo[5.2.1.0$^{2,6}$]decanedicarboxylic acid selected from the group consisting of a tricyclo[5.2.1.0$^{2,6}$]decane-3,8-dicarboxylic acid, a tricyclo[5.2.1.0$^{2,6}$]decane-3,9-dicarboxylic acid, and a tricyclo[5.2.1.0$^{2,6}$]decane-4,8-dicarboxylic acid represented by the following formulae (2a) to (2c):

(2a)
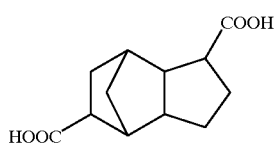

(2b)
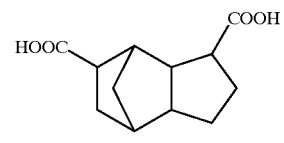

(2c)
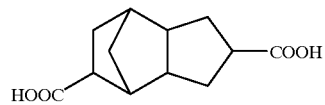

wherein each of carbon atoms constituting a ring may have at least one substituent.

5. A polyester polymer according to any one of claims 1 to 4, wherein said polyester polymer has a number average molecular weight of 1000 to 150000.

6. A polyester polymer according to any one of claims 1 to 4, wherein said polyester polymer has a number average molecular weight of 3000 to 100000.

7. A process for producing a polyester polymer, comprising the step of subjecting a diol component and a dicarboxylic acid component or a reactive derivative thereof to polycondensation, wherein (i) said diol component comprises at least one tricyclo[5.2.1.0$^{2,6}$]decanedimethanol represented by the following formula (1):

(1)

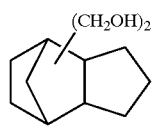

wherein two hydroxymethyl groups are bound to carbon atoms constituting tricyclo[5.2.1.0$^{2,6}$]decane ring and wherein each of carbon atoms constituting the ring may have at least one additional substituent; or (ii) said dicarboxylic acid component comprises at least one tricyclo[5.2.1.0$^{2,6}$]decanedicarboxylic acid represented by the following formula (2):

(2)

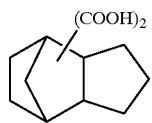

wherein two carboxyl groups are bound to carbon atoms constituting tricyclo[5.2.1.0$^{2,6}$]decane ring and wherein each of carbon atoms constituting the ring may have at least one additional substituent.

8. A process according to claim 7, wherein a diol component and a dicarboxylic acid component or a reactive derivative thereof are subjected to polycondensation, said diol component comprising at least one tricyclo[5.2.1.0$^{2,6}$] decanedimethanol represented by the following formula (1):

(1)

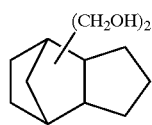

wherein two hydroxymethyl groups are bound to carbon atoms constituting tricyclo[5.2.1.0$^{2,6}$]decane ring and wherein each of carbon atoms constituting the ring may have at least one additional substituent; and said dicarboxylic acid component comprising at least one tricyclo[5.2.1.0$^{2,6}$] decanedicarboxylic acid represented by the following formula (2):

(2)

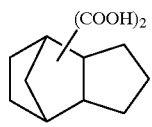

wherein two carboxyl groups are bound to carbon atoms constituting tricyclo[5.2.1.0$^{2,6}$]decane ring and wherein each of carbon atoms constituting the ring may have at least one additional substituent.

9. A process according to claim 7, wherein
(i) said diol component comprises at least one tricyclo [5.2.1.0$^{2,6}$]decanedimethanol selected from the group consisting of a tricyclo[5.2.1.0$^{2,6}$]decane-3,8-dimethanol, a tricyclo[5.2.1.0$^{2,6}$]decane-3,9-dimethanol, and a tricyclo[5.2.1.0$^{2,6}$]decane-4,8-dimethanol represented by the following formulae (1a) to (1c):

(1a)

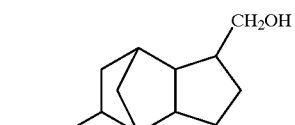

(1b)

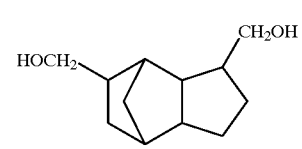

(1c)

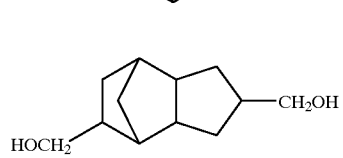

wherein each of carbon atoms constituting a ring may have at least one substituent; or (ii) said dicarboxylic acid component comprises at least one tricyclo[5.2.1.0$^{2,6}$]decanedicarboxylic acid selected from the group consisting of a tricyclo [5.2.1.0$^{2,6}$]decane-3,8-dicarboxylic acid, a tricyclo [5.2.1.0$^{2,6}$]decane-3,9-dicarboxylic acid, and a tricyclo [5.2.1.0$^{2,6}$]decane-4,8-dicarboxylic acid represented by the following formulae (2a) to (2c):

(2a)

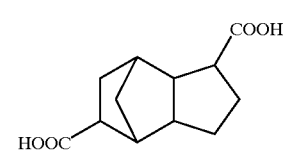

(2b)

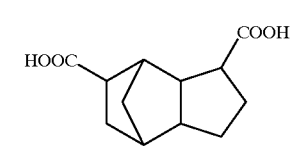

(2c)

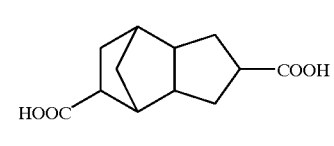

wherein each of carbon atoms constituting a ring may have at least one substituent.

10. A process according to claim 8, wherein a diol component and a dicarboxylic acid component or a reactive derivative thereof are subjected to polycondensation, said diol component comprising at least one tricyclo[5.2.1.0$^{2,6}$] decanedimethanol selected from the group consisting of a tricyclo[5.2.1.0$^{2,6}$]decane-3,8-dimethanol, a tricyclo [5.2.1.0$^{2,6}$]decane-3,9-dimethanol, and a tricyclo[5.2.1.0$^{2,6}$] decane-4,8-dimethanol represented by the following formulae (1a) to (1c):

(1a)
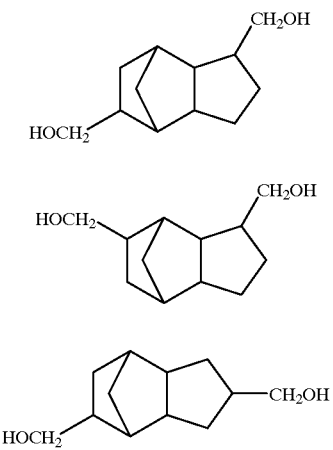

(1b)

(1c)

wherein each of carbon atoms constituting a ring may have at least one substituent; and said dicarboxylic acid component comprising at least one tricyclo[$5.2.1.0^{2,6}$] decanedicarboxylic acid selected from the group consisting of a tricyclo[$5.2.1.0^{2,6}$]decane-3,8-dicarboxylic acid, a tricyclo[$5.2.1.0^{2,6}$]decane-3,9-dicarboxylic acid, and a tricyclo[$5.2.1.0^{2,6}$]decane-4,8-dicarboxylic acid represented by the following formulae (2a) to (2c):

(2a)
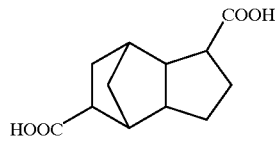

(2b)
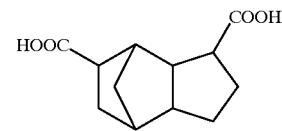

(2c)
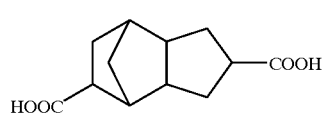

wherein each of carbon atoms constituting a ring may have at least one substituent.

* * * * *